(12) United States Patent
Gehret

(10) Patent No.: US 7,284,761 B2
(45) Date of Patent: Oct. 23, 2007

(54) BIT STOP FOR DRILL CHUCK

(75) Inventor: Robert S. Gehret, Hampstead, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/343,846

(22) Filed: Jan. 31, 2006

(65) Prior Publication Data

US 2006/0170167 A1    Aug. 3, 2006

Related U.S. Application Data

(60) Provisional application No. 60/649,744, filed on Feb. 3, 2005.

(51) Int. Cl.
*B23B 31/167* (2006.01)
*B23B 31/12* (2006.01)

(52) U.S. Cl. .................. 279/62; 279/123; 279/156; 279/902

(58) Field of Classification Search ............ 279/60–64, 279/71, 156, 123, 902; 408/240
See application file for complete search history.

(56) References Cited

U.S. PATENT DOCUMENTS

| 824,735 | A | * | 7/1906 | Mowat | 279/62 |
|---|---|---|---|---|---|
| 990,172 | A | * | 4/1911 | Taylor | 279/62 |
| 1,059,234 | A | * | 4/1913 | Taylor | 279/62 |
| 1,061,934 | A | * | 5/1913 | Church | 279/62 |
| 1,927,981 | A | * | 9/1933 | Hassner | 279/61 |
| 2,189,068 | A | * | 2/1940 | Hubbell | 279/62 |
| 3,237,955 | A | * | 3/1966 | Haviland et al. | 279/63 |
| 3,325,166 | A | * | 6/1967 | Haviland et al. | 279/63 |
| 3,545,776 | A | * | 12/1970 | Haviland | 279/63 |
| 4,669,932 | A | * | 6/1987 | Hartley | 408/239 R |
| 4,726,719 | A | * | 2/1988 | Mack | 408/240 |
| 4,752,165 | A | * | 6/1988 | Wanner | 408/239 R |
| 5,195,760 | A | * | 3/1993 | Wheeler et al. | 279/60 |
| 6,129,363 | A | * | 10/2000 | Mack | 279/62 |
| 6,688,610 | B2 | * | 2/2004 | Huggins et al. | 279/22 |
| 6,726,222 | B2 | * | 4/2004 | Rohm et al. | 279/71 |
| 2003/0155723 | A1 | * | 8/2003 | Rohm et al. | 279/62 |

FOREIGN PATENT DOCUMENTS

GB    2030485 A    *    4/1980

* cited by examiner

*Primary Examiner*—Erica Cadugan
(74) *Attorney, Agent, or Firm*—Harness, Dickey & Pierce, P.L.C.

(57) ABSTRACT

A tool bit stop located on an inner surface of a clamping jaw of a drill chuck. The tool bit stop is located a distance from a jaw gripping surface of the clamping jaw. The tool bit stop is adapted to provide a surface to register an end of a tool bit in a consistent location relative to the jaw gripping surface. The tool bit stop is shaped to allow advancement and retraction of the clamping jaws without interference from the tool bit stop.

4 Claims, 1 Drawing Sheet

BIT STOP FOR DRILL CHUCK

CROSS-REFERENCE TO RELATED APPLICATIONS

This application claims the benefit of U.S. Provisional Application No. 60/649,744, filed on Feb. 3, 2005, the disclosure of which is incorporated herein by reference.

FIELD OF THE INVENTION

The present invention relates to a chuck assembly for releasably gripping a tool bit, and more particularly, to a chuck assembly having a tool bit stop located thereon.

BACKGROUND OF THE INVENTION

Various types of drill chuck assemblies are well known in the art. Typical drill chuck assemblies include a series of clamping jaws for selectively gripping a tool bit. As the clamping jaws advance along the drive spindle axis, the jaw gripping portions of the clamping jaws are advanced radially inwardly, causing the jaw gripping portions to approach each other. When a tool bit is located in the chuck, this radially inward advancement causes the jaw gripping surfaces of the jaw gripping portion of the clamping jaws to eventually contact and fixedly engage the tool bit. When the tool bit is initially inserted into the drill chuck, the tool bit is free to fall to the bottom of the chuck cavity. While this may cause no issues for larger tool bits, it does create some problems for smaller tool bits.

The larger tool bits typically have a larger diameter and a longer gripping shaft. This combination results in a larger tool bit placed in a chuck to pass to the bottom of the chuck and still have the full drilling portion of the shaft of the tool bit exposed. The larger diameter requires less axial advancement of the clamping jaws to secure the tool bit. This combined with the already longer gripping portion of the tool bit shaft allows for easy installation of the tool bit.

The smaller tool bits are typically smaller in diameter and have a shorter gripping shaft. This results in a potential problem if the smaller tool bit is fully inserted into the chuck. This problem results because the gripping portion of the tool bit shaft is shorter than that of the larger tool bits, while the gripping surfaces of the jaws have moved axially forward while closing on the smaller bit diameter, resulting in a shorter gripping portion retained in a longer cavity. Placing a smaller tool bit in a chuck all the way to the bottom often results in a significant portion of the drilling portion of the shaft being contained within the cavity and/or overlapped by the jaws.

In order to prevent this from occurring, the tool bit would need to be held at the desired installation location while simultaneously tightening the chuck to engage the bit. This can be very problematic when attempting to install the tool bit by oneself.

SUMMARY OF THE INVENTION

The present invention provides a novel way of limiting the travel of tool bits when placed in a chuck assembly. Specifically, the invention provides a design wherein a tool bit stop is included on the inner surface of a clamping jaw. The tool bit stop is located a distance from a jaw gripping surface of the clamping jaw. The tool bit stop is adapted to provide a surface to register an end of a tool bit in a consistent location relative to the jaw gripping surface. The tool bit stop is shaped to allow advancement and retraction of the clamping jaws without interference from the tool bit stop.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
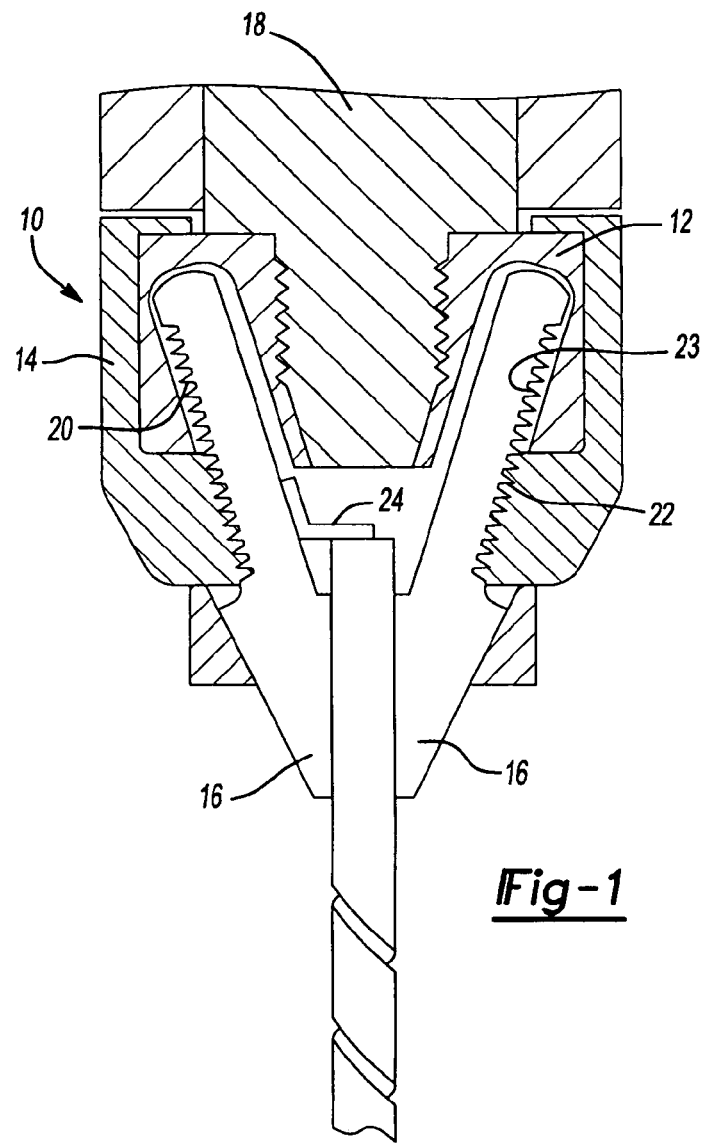
FIG. 1 is a cross-sectional view of an exemplary drill chuck assembly including a tool bit stop attached to one of the clamping jaws.

FIG. 1 depicts a drill bit chuck 10 including a drill chuck core 12, a rotating ring 14 and a plurality of clamping jaws 16. The drill chuck core 12 is fixedly attached to a drive spindle 18 and contains a plurality of clamping jaw chambers 20 for each of the clamping jaws 16. The clamping jaws 16 are contained within the chambers 20 and are bearingly supported on the inner surface in a known manner obliquely to the axis of the drive spindle 18. The rotating ring 14 is rotatably coupled to the drill chuck core 12. The clamping jaws 16 are translated in a forward or rearward direction through engagement with the threaded portion 23 on the outer surface with the interior threading 22 of the rotating ring 14. By rotating the ring 14 in a clockwise direction, the clamping jaws 16 are advanced, causing them to clamp down on an object such as a tool bit. By rotating the ring 14 in a counterclockwise direction, the clamping jaws 16 are retracted, causing them to release an object such as a drill bit. When the clamping jaws 16 are in a tightened position, the rotating ring 14, and therefore the clamping jaws 16 are fixedly coupled to the drill chuck core 12, causing them to rotate with the drill chuck core 12.

Figure 2:
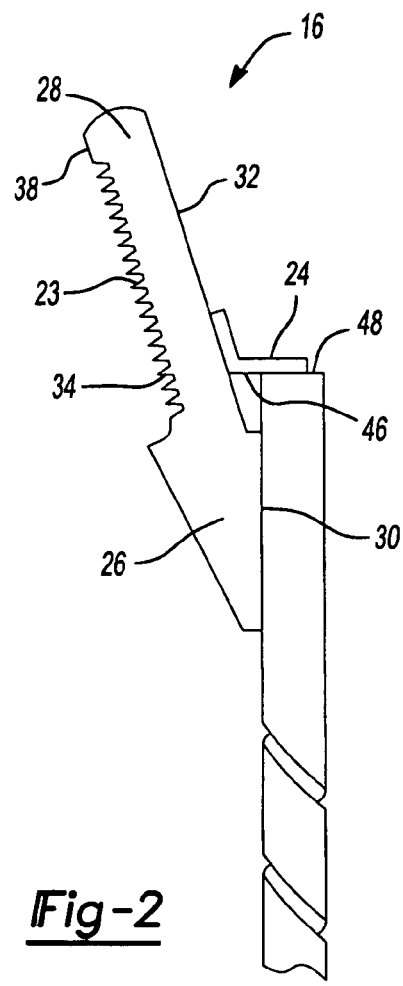
FIG. 2 is a perspective view of a clamping jaw including the tool bit stop retaining a tool bit.

FIG. 2 depicts a clamping jaw 16 having an attached tool bit stop 24. The clamping jaw 16 includes a jaw gripping portion 26 and a body portion 28 extending at an angle therefrom. The jaw gripping portion 26 includes a jaw gripping surface 30. The body portion 28 includes inner and outer surfaces 32, 34. The outer surface 34 includes a threaded portion 23 adapted to engage the threading 22 on the rotating ring 14. The outer surface 34 also includes a non-toothed portion 38 at the end farthest from the jaw gripping portion 26, limiting the axial travel of the clamping jaw 16. The inner surface 32 includes the tool bit stop 24 fastened thereto.

The tool bit stop 24 is positioned a distance past the jaw gripping surface 30 of the jaw gripping portion 26. The tool bit stop 24 is generally comprised of an arm portion 40 and an attachment portion 42. The arm portion 40 is shown to extend generally perpendicular to the jaw gripping surface 30 and/or the axis of rotation of the drill chuck 10. However, it is understood that the arm portion 40 may also extend at some angle, provided that it still serves as a stop for a tool bit entering the chuck 10. The attachment portion 42 is generally parallel with the inner surface 32 of the clamping jaw 16. The attachment portion 42 may be fixed to the inner surface 32 of the clamping jaw 16 in a variety of ways ranging from fasteners to adhesives, welding, or soldering.

The tool bit stop 24 may be comprised of a variety of materials ranging from metals to plastics. The tool bit stop 24 may be made of a flexible material such that it may be overridden by pushing a tool bit past the stop, causing the stop to fold out of the way.

Alternatively, the tool bit stop 24 may be formed from the same piece of material as the clamping jaw 16. In a metal embodiment, the tool bit stop 24 may be machined in-place on the clamping jaw 16.

The tool bit stop 24 may be present on any number of clamping jaws 16, ranging from a single clamping jaw 16 to all of the clamping jaws 16 or on a separate retractable member that is separate from the jaws.

Figure 3:
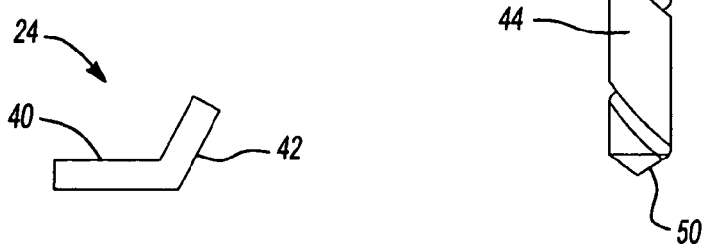
FIG. 3 is a cross-sectional view of the tool bit stop of the present invention.

FIG. 3 depicts the interaction between a tool bit 44 and the tool bit stop 24. A generally cylindrical tool bit 44 is shown contacting the upper surface 46 of the tool bit stop 24. The tool bit 44 has a lower surface 48 located on a distal end from the tool bit head 50. When the tool bit 44 is placed in a chuck 10, the lower surface 48 of the tool bit 24 contacts the upper surface 46 of the tool bit stop 24. This contact prevents the tool bit 44 from freely passing to the bottom of the drill chuck 10 and provides a consistent position for locating a tool bit 44.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drill chuck comprising:
   a chuck core including a plurality of jaw chambers;
   a plurality of clamping jaws adjustably received in said plurality of jaw chambers, said clamping jaws including an inner surface facing an axis of rotation of said chuck core, said clamping jaws including a first end having a jaw gripping surface on said inner surface; and
   a tool bit stop fixedly attached to one of said clamping jaws and extending generally radially inward from said inner surface of said one of said clamping jaws, said tool bit stop located between said jaw gripping surface and a second end of said clamping jaw, said tool bit stop intersecting said axis of rotation of said chuck core, wherein said tool bit stop is comprised of a flexible material capable of being overridden by folding back when a tool bit is urged past said tool bit stop.

2. The drill chuck as claimed in claim 1, wherein said tool bit stop is comprised of a plastic.

3. The drill chuck as claimed in claim 1, wherein said tool bit stop is comprised of a metal.

4. The drill chuck as claimed in claim 1, wherein said tool bit stop is attached to said clamping jaw by at least one of welding, screwing, riveting, and bonding.

* * * * *